2,886,490

PROCESS OF PRODUCING COBALAMINES BY FERMENTING CULTURE MEDIA WITH *NOCARDIA RUGOSA*

Aurelio di Marco and Celestino Spalla, Milan, Italy, assignors to Società Farmaceutici Italia, a corporation of Italy No Drawing. Application April 25, 1956
Serial No. 580,460

Claims priority, application Italy April 27, 1955

8 Claims. (Cl. 195—80)

This invention relates to a new species of Nocardia and to a method of producing cobalamines by means of this species.

As known, the term "cobalamines" implies both the vitamin $B_{12}$ in the form containing the $CN^-$ group, as well as compounds that are similar to vitamin $B_{12}$, differing only in having the $CN^-$ group substituted by other anions. Hitherto, cobalamines have been industrially produced by means of *Streptomyces griseus*, str. *aureofaciens*, str. *olivaceous*, *Bacillus megatherium*, *Lactobacillus casei* and *Propionibacterium freudenreichii*, etc.

The herein described species which we have named *Nocardia rugosa*, has been isolated from the content of the digestive tract of cattle. It is identifiable not only by its morphological characteristic and specific features in growth-cultures, but also by its ability of producing high amounts of cobalamines. A culture of the organism of *Nocardia rugosa* has been deposited in the Waksman Collection, at Rutgers University, New Brunswick, New Jersey, under the Index Number 3,760 (December 1957).

I. Description and classification of the strain:

*Morphological characteristics.* — The mycelium is formed by hyphae having a diameter of 0.6 to 0.8μ, that are first sinuous and then more or less angularly folded. At the age of 12 hours, slight ramification commences, the branches extending radially from a central area. At the age of 20 to 24 hours, the hyphae fragmentize into rod-like bodies having the thickness of the hyphae and a length varying between 8 and 20μ. After a few hours the fragmentation spreads over almost the entire colony.

The fragments may be straight, folded at more or less obtuse angles or bent in various ways. Mycelium and fragments are readily colored with the usual dyes: fuchsine, methylene blue, etc.; they are gram-positive, not resistant to acids and only partly resistant to alcohol.

*General characteristics.*—On meat-agar, excellent growth within 24 hours is observed. The colonies form a thick, honey-colored coat that is wrinkled and folded and has the consistency of cream. In cultures more than 15 days old, a brown pigment is noted in the substratum.

On potato-agar, moderate growth of a soft, colorless mycelium is obtained which, generally, is smooth with some wrinkled and folded parts.

On asparagine-agar, moderate growth is obtained in form of a thick, colorless, slanting and damp coating, that is wrinkled at the thickest part of the inclined agar.

On nutritive glycerin agar, extremely good growth of a soft coating is obtained that is wrinkled in the form of darkly cream-colored corals. After 15 days an umber-colored pigment is found diffused in the substratum.

On Saboraud agar, extremely good coral-like growth is obtained that forms very heavy, colorless but soft folds.

In meat broth, the organism produces a gelatinous mass deposited at the bottom of the test tube. The broth remains clear.

In milk the organism forms a coagulum after 8 days which settles at the bottom, leaving a clear serum. The milk is not peptonized and the pH remains unchanged.

The organism liquefies gelatine, does not exhibit diastatic activity and is not pathogen. The pH optimum for growth is 6.8 to 7.2, the temperature optimum is 34° to 36° C.

*Differential characteristics.*—The organism produces cobalamines. In agitated cultures, a diffused, intensely reddish-brown pigment is produced.

By comparing the foregoing description with that of the genus *Nocardia trevisan*, the two seem to correspond with each other. However, attempts of establishing the specific strain identity according to the keys of Krassilnikov (1941) or Wakeman and Henrici (1943) are without success; none of the described species possesses characteristics corresponding with those of the herein-described strain. It is to be concluded, therefore, that the herein-described strain has not been isolated, as yet, and the binomial term *Nocardia rugosa* is herewith proposed as the name of the newly isolated organism.

Broth, from which the organism has been separated after fermentation contains a growth factor for the following strains:

*Lactobacillus leichmanii* (ATCC 4797), which requires vitamin $B_{12}$ or desoxyribonucleosides,

*Lactobacillus lactis* Dorner (ATCC 10697),

*Escherichia coli* (113/3), which requires vitamin $B_{12}$ or methionine.

The identity of the growth factor with members of the group of cobalamines has been established by chromatography and electrophoresis on paper, followed by bioautographies of plates of *Escherichia coli* (113/3).

II. Biological methods of estimating $B_{12}$ activity of fermentation broths by means of:

(1) *Lactobacillus lactis* Dorner (ATCC 10697)
(2) *Lactobacillus leichmanii* (ATCC 4797)
(3) *Escherichia coli* (113/3) in liquid medium
(4) *Escherichia coli* (113/3) on plates

*Fermentation technique.*—The substrate used for growth and propagation by fermentation consists, substantially, of a carbohydrate source, a nitrogen source, and a number of salts. The carbohydrates may be: glucose, maltose, saccharose, dextrin, lactose, mannose, galactose, or they may be provided by materials containing carbohydrates, such as corn steeping extract, molasses, malt extract and the like.

Several fats may be also employed, such as lard oil, sesame oil, peanut oil.

The nitrogen source may be added in form of peptones, casein hydrolysates, meat extract, yeast extract, casein, ammonium sulfate, ammonium nitrate, asparagine, cystein, tryptophane, tyrosine, cystine.

Moreover, the formulas for the culture broth may contain, as the case may be: $Na_2HPO_4$, $KH_2PO_4$, $CaCO_3$, $MgCl_2$, $CaCl_2$, $CuSO_4$, $FeSO_4$, $ZnSO_4$, $MgSO_4$ and cobalt in form of the chloride, nitrate, or in form of an organic compound.

Of fundamental importance for obtaining high vitamin yields is the presence of surface-active materials in the substrate. Suitable for this purpose are partial esters of hexitol-anhydrides and fatty acids, or their polyoxyalkylene derivatives (Tween, Span, etc.).

After adjusting the pH to 6.7–6.9 by means of hydrochloric acid or sodium hydroxide, the infusion is sterilized and a portion thereof inoculated with a vigorous culture, grown on nutrient agar. The sample is then incubated under suitable conditions of aeration and stirring, at a temperature ranging from 30° to 37° C. and for a time sufficient to assure good growth of the microorganism, usually for 24 to 28 hours. The suspension obtained in this manner is used to inoculate the production batch. The amount used to inoculate the production batch varies from 5 to 10% of the latter, in inverse order of the desired degree of growth.

The production batch is then fermented under similar conditions. Daily samples are withdrawn for the purpose of controlling growth, pH, vitamin $B_{12}$ production, nitrogen and carbohydrate consumption and for determining the absence of infection.

The fermentation may be considered completed when two consecutive vitamin titrations show the absence of any concentration increase in the fermentation liquor. Normally, this occurs after about 120 hours. At this stage the fermentation liquor has the appearance of a medium dense liquid, reddish-brown in color, with a pH of about 6 and without any disagreeable or persistent smell.

At the end of the fermentation period, most of the substances characterized by APF activity, and particularly the members of the group of cobalamines are associated with the cellular tissue and, therefore, found within the solid phase of the batch.

In order to utilize these active substances by integration in foodstuffs and feeds, any of the known processes may be employed, provided the process results in a non-perishable product, suitable for oral administration. For example, the following processes have been found useful:

(a) After acidifying the batch to a pH ranging from 3 to 6 and heating in an autoclave for 30–60 minutes to 120° C., it is vacuum-concentrated to $\frac{1}{10}$–$\frac{1}{20}$ of its original volume, at a temperature not exceeding 40° C. The resulting syrupy material is dried and ground, providing a stable and readily utilizable powder.

(b) The fermented wort is centrifuged, the liquid phase discarded, and the solid residue washed with water, heated for 30–60 minutes in an autoclave to 120° C., dried, powdered and administered in powder form.

(c) After separation by centrifugation and washing as described in (b), the solid phase of the fermented wort is suspended in an amount of water equal to about 10 to 50% of the wort. The suspension is acidified to a pH value of 3 to 6 and heated in an autoclave to 120° C. for 30 to 60 minutes. Upon centrifuging or filtering the suspension, an aqueous extract of the active principle is obtained, which is concentrated and dried under vacuum to provide a highly potent, stable powder, ready for use.

The selection of either of the afore-described methods, or a combination thereof, depends upon the concentration and the desired potency of the product.

The fermentation processes of the following examples are presented to illustrate the invention, but without intention of limiting thereby the scope of the appended claims.

*Example 1*

Composition of wort:

| | | |
|---|---|---|
| Dextrin | percent | 8.0 |
| Molasses | do | 0.4 |
| Peptone | do | 1.0 |
| $CaCO_3$ | do | 0.5 |
| NaCl | do | 0.5 |
| $(NH_4)SO_4$ | do | 0.5 |
| $FeSO_4$ | p.p.m. | 5 |
| $MgCO_3$ | percent | 0.2 |
| $CaCl_2$ | p.p.m. | 10 |

Tap water, to 100.

In a steel fermentation tank, 70 liters in capacity, 50 liters of broth are sterilized for 90 minutes, at a temperature of 121° C. At the end of the sterilization, the pH is adjusted to a value of 6.20–6.45. After cooling to 33° C., inoculation is effected by introducing 100 cc. of a suspension obtained by washing a nutritive agar culture. This seed culture is incubated at 33° C. for a period of time ranging from 25 to 40 hours while applying aeration corresponding to 30–50 liters of air per minute and stirring at 150 to 300 revolutions per minute.

At the end of the incubation, the weight of dry mycelium varies from 3 to 5 mg./cc. of wort.

The seed culture is used to inoculate a production size fermentation tank. The fermentation, in this second tank, is carried out for 120–140 hours, under the aforedescribed conditions of the seed culture. The final vitamin $B_{12}$ concentration varies from 3 to 5 gamma/cc.; the dry weight from 12 to 14 m$\gamma$/cc.

The mycelium is separated from the broth by filtration, and after extraction as previously described, the product is mixed into feed concentrates, or is further purified.

*Example 2*

Wort:

| | | |
|---|---|---|
| Glucose | percent | 4.0 |
| Corn steeping extract | do | 2.0 |
| Yeast extract | do | 0.5 |
| Peanut oil | do | 0.3 |
| $CaCO_3$ | do | 0.5 |
| $KH_2PO_4$ | do | 0.2 |
| $Na_2HPO_4$ | do | 0.5 |
| $CaCl_2$ | p.p.m. | 10 |

Tap water, to 100.

The wort, without glucose, is sterilized for 90 minutes at 120° C. Glucose is then added under sterile conditions which had been previously sterilized for 20 minutes at 115° C.

The process is carried out as in Example 1.

The highest yield amounts to 2–4 gamma/cc. after 110 hours of fermentation.

*Example 3*

Wort:

| | | |
|---|---|---|
| Saccharose | percent | 7.0 |
| N–Z/amine | do | 1.0 |
| $(NH_4)_2SO_4$ | do | 0.5 |
| Cysteine | do | 0.05 |
| $KH_2PO_4$ | do | 0.2 |
| $Na_2HPO_4$ | do | 0.5 |
| NaCl | do | 1.0 |
| $CuSO_4$ | p.p.m. | 0.5 |
| $FeSO_4$ | p.p.m. | 1 |
| $CaCl_2$ | p.p.m. | 10 |

Tap water, to 100.

The wort is sterilized at 120° C. for 90 minutes and the process is carried out as in Example 1. The highest yield, amounting to 3–5 gamma/cc., is obtained after 130 hours of fermentation.

Example 4

Wort:

| | | |
|---|---|---|
| Malt extract | percent | 4.0 |
| Glucose | do | 4.0 |
| N–Z/amine | do | 1.5 |
| Corn steeping extract | do | 0.5 |
| $CaCO_3$ | do | 0.5 |
| $(NH_4)_2SO_4$ | do | 0.5 |
| NaCl | do | 1.0 |
| $CaCl_2$ | p.p.m | 10 |

Tap water, to 100.

The process is carried out as in Example 2.

The highest yield amounts to 3–5 gamma/cc. after 120 hours of fermentation.

Example 5

Wort:

| | | |
|---|---|---|
| Glucose | percent | 4.0 |
| Lactose | do | 2.0 |
| Peptone | do | 1.0 |
| Yeast extract | do | 0.25 |
| $KH_2PO_4$ | do | 0.2 |
| $Na_2HPO_4$ | do | 0.5 |
| NaCl | do | 1.0 |
| Tween 80 | do | 0.05 |
| $CaCl_2$ | p.p.m | 10 |

Tap water, to 100.

Sterilization is effected at 120° C. for 90 minutes. The process is carried out as in Example 1. Yield: 3–5 gamma/cc.

We claim:

1. The process for the production of cobalamines which comprises fermenting an aqueous nutrient medium including a cobalt source under submerged aerated conditions by means of *Nocardia rugosa*, and recovering a cobalamine concentrate.

2. The process according to claim 1, wherein said aqueous nutrient medium contains a surface active stimulant selected from the group of partial esters between hexitol-anhydrides and fatty acids and polyoxyalkylene derivatives thereof.

3. The process for the production of cobalamines which comprises preparing an aqueous nutrient medium including a cobalt source and a surface active stimulant selected from the group of partial esters between hexitol-anhydrides and fatty acids and polyoxyalkylene derivatives thereof, adjusting the pH to 6.7–6.9, sterilizing, cooling to between 30 and 37° C., inoculating with a culture of *Nocardia rugosa*, fermenting at a temperature of 30 to 37° C. while stirring and aerating at a rate of 0.6 to 1.0 liter/min. of air per one liter of nutrient medium, continuing the fermentation until there is no further increase in vitamin $B_{12}$ concentration, and recovering a cobalamine concentrate.

4. The process according to claim 3, wherein said cobalamine concentrate is recovered by acidifying to a pH of 3 to 6, heating in an autoclave for 30 to 60 minutes to 120° C., vacuum concentrating at a temperature not exceeding 40° C. to from $\frac{1}{10}$ to $\frac{1}{20}$ of the original volume, drying and reducing the dried material to pulverulent consistency.

5. The process according to claim 3, wherein said cobalamine concentrate is recovered by centrifuging, washing separated solids with water, heating said solids for 30 to 60 minutes to 120° C. and drying and powdering said solids.

6. The process according to claim 5, which comprises dispersing the separated solids in an amount of water equal to 10–50% of the aqueous nutrient medium, acidifying to a pH of 3 to 6, heating for 30 to 60 minutes to a temperature of 120° C., removing the solids, concentrating and drying the liquid in vacuo, and reducing the dry residue to pulverulent consistency.

7. The process for the production of cobalamines which comprises fermenting an aqueous nutrient medium under submerged aerated conditions by means of *Nocardia rugosa*, and recovering a cobalamine concentrate.

8. The process for the production of cobalamines which comprises fermenting an aqueous nutrient medium under submerged aerated conditions by means of *Nocardia rugosa*, and recovering a cobalamine concentrate, said aqueous nutrient medium containing a surface active stimulant selected from the group of partial esters between hexitol-anhydrides and fatty acids and polyoxyalkylene derivatives thereof.

References Cited in the file of this patent

UNITED STATES PATENTS

| | | |
|---|---|---|
| 2,650,896 | McDaniel et al. | Sept. 1, 1953 |
| 2,703,302 | Rickes et al. | Mar. 1, 1955 |

OTHER REFERENCES

Shaw: Jour. Pharm. and Pharmacol. I (No. 10), 1949, pp. 695–700.

Hall et al.: Soc. Am. Bact. Proc., 50th Meeting, May 1950, p. 21.

Burton et al.: Canadian Journal of Botany, vol. 29, No. 4, August 1951, pp. 352 to 359 (pp. 355 to 357 relied on).

Bergey's Manual of Determinative Bacteriology, 6th ed., Williams and Wilkins, Baltimore, pp. 892 and XIV.